United States Patent [19]
Kawakami et al.

[11] Patent Number: 4,788,596
[45] Date of Patent: Nov. 29, 1988

[54] IMAGE STABILIZING DEVICE

[75] Inventors: Eigo Kawakami, Kawasaki; Yukichi Niwa, Narashino; Mitsutoshi Ohwada; Yasuo Ogino, both of Yokohama; Minoru Yoshii; Shigeyuki Suda, both of Tokyo, all of Japan

[73] Assignee: Canon Kabushiki Kaisha, Tokyo, Japan

[21] Appl. No.: 855,732

[22] Filed: Apr. 25, 1986

[30] Foreign Application Priority Data

Apr. 26, 1985 [JP] Japan .................................. 60-90116
May 24, 1985 [JP] Japan ................................ 60-111472

[51] Int. Cl.$^4$ .............................................. H04N 5/228
[52] U.S. Cl. ...................................... 358/222; 358/229
[58] Field of Search ................. 358/222, 229; 350/500

[56] References Cited

U.S. PATENT DOCUMENTS

| | | | |
|---|---|---|---|
| 3,577,205 | 5/1971 | Hobrough | 358/222 |
| 3,651,325 | 3/1972 | Alpers | 358/222 |
| 3,958,008 | 5/1976 | Schadler | 358/229 |
| 4,249,792 | 2/1981 | Moriez | 350/500 |
| 4,600,940 | 7/1986 | Sluyter | 358/229 |
| 4,639,772 | 1/1987 | Sluyter et al. | 358/229 |

Primary Examiner—Jin F. Ng
Assistant Examiner—Stephen Brinich
Attorney, Agent, or Firm—Fitzpatrick, Cella, Harper & Scinto

[57] ABSTRACT

A characteristic point such as an image contrast of a target image in an image screen of an object produced by an image sensor is counted, a correlation between counts at two points in time is determined. A drive means for preventing vibration of an imaging lens is controlled in accordance with the correlation signal and imaging information such as in-focus or out-of-focus information.

6 Claims, 6 Drawing Sheets

IMAGE STABILIZING DEVICE

BACKGROUND OF THE INVENTION

1. Field of the Invention

The present invention relates to an imaging optical device such as TV camera, electronic camera, video camera or industrial imaging instrument, and more particularly to an imaging optical device having anti-vibration and tracking functions.

2. Related Background Art

For an imaging optical device having anti-vibration and tracking functions, a servo type anti-vibration device for a TV camera and an image tracking device as disclosed in Japanese Patent Publication No. 25509/1984 have been proposed. The former device absorbs and relieves vibration of the device due to vibration of a vehicle by mechanically dumping the vibration by an air dumper. This device measures absolute angular acceleration, absolute angular velocity and absolute angle in a tilt space applied to a camera lens system by a pair of acceleration meters, rute gyrometers, or free gyrometers to detect the absolute position of the camera. This information is fed back to a motor which controls an entire TV camera so that the attitude of the entire TV camera is controlled to prevent vibration.

In the latter anti-vibration device, a tracking target is imaged by a TV camera. Images having a time difference are stored in a scan conversion memory, center positions of tracking targets of the stored images are detected, and a body of the TV camera is driven through a universal head by a control signal. This signal is derived from the difference between the center positions of the tracking targets.

Since this device drives the entire TV camera, it requires a large size high power actuator. Thus, the device is of large size and requires a large amount of power.

In "Anti-Vibration Device For a TV Camera Mounted on a Moving Vehicle" NHK Technical Laboratory Monthly Report, Vol. 117, No. 4 (April, 1974), a known liquid prism such as that disclosed in Japanese Patent Publication No. 11906/1966, that is a prism including a pair of parallel glass plates which can be tilted to each other and a rubber bellows to define a space in which liquid is filled is provided. Angles of vertical and horizontal movement of a TV camera by vibration are detected by vertical and horizontal pairs of gyrometers, and the angle of the parallel glass plates is changed by a gyromoment to form a prism apex angle necessary to compensate vibration of image. Since this device has transmission mechanisms among devices such as gyrometers, gyromoment and liquid prism, the device is of large size and heavy. Further, since it utilizes an inertia of the gyrometer, it is difficult to smoothly pan the device.

In another prior art anti-vibration device, an imaging optical system is arranged in a lens barrel and an image picked up by an imaging optical system is taken out by an imaging sensor as an image signal, which is processed to detect vibration of the image, distance of movement and direction of movement. A motor which presents vibration of the image by the detected signals is arranged in a body of the camera. Thus, the lens barrel and the camera body are together driven by the anti-vibration means, as a result, the device is of large size and a high power drive motor is required.

SUMMARY OF THE INVENTION

It is an object of the present invention to provide a device for preventing vibration of a lens barrel by assembling an imaging optical system and an image sensor into the lens barrel, movably supporting the lens barrel relative to a camera body, detecting vibration of the lens barrel by a signal from the image sensor, and preventing the vibration of the lens barrel by the detected signal.

It is another object of the present invention to provide a device for preventing vibration by assembling an imaging optical system and an image sensor into a lens barrel and driving only the lens barrel.

It is other object of the present invention to provide a device which counts a characteristic point, for example, contrast of an image produced by an image sensor, measures a correlation between characteristic points at two time points to detect movement of the image, and corrects the detected movement signal of the image based on a camera imaging signal such as in-focus or out-of-focus information to control the movement of the lens barrel.

DETAILED DESCRIPTION OF THE PREFERRED EMBODIMENTS

Figure 1:
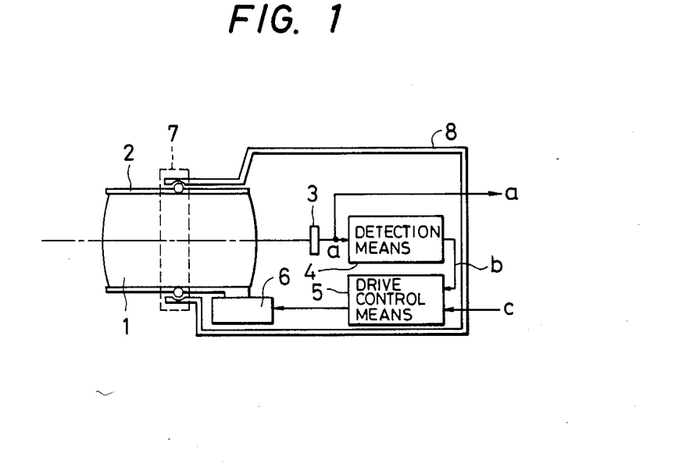
FIG. 1 shows an embodiment of an imaging optical device of the present invention.

FIG. 1 shows an imaging optical device of the present invention. Numeral 1 denotes an imaging optical system, numeral 2 denotes a lens barrel of the imaging optical system 1, numeral 3 denotes an imaging sensor which produces an image signal a, numeral 4 denotes detection means which receives the image signal a to detect direction and distance of movement of the image, numeral 5 denotes drive control means for supplying a control signal to a drive actuator in response to a signal b from the detection means 4 and another signal c. Numeral 6 denotes the drive actuator for driving the imaging optical system 1 held in the lens barrel 2 and the image sensor 3 through a movable mechanism, numeral 7 denotes the movable mechanism which renders the image input means including the imaging optical system 1 and the image sensor 3 movable to the camera housing, and numeral 8 denotes the camera housing.

The image signal a produced by the image sensor 3 through the imaging optical system 1 is supplied to the detection means 4. The detection means 4 detects distance and direction of movement of a target image on the image sensor 3 and produces the signal b relating to the direction and distance of movement and supplies it to the drive control means 5. In response to the signal b and other signal c, a control signal is supplied to the drive actuator 6 from the drive control means 5, and the image input means including the imaging optical system 1 and the imaging sensor 3 is driven relative to the camera housing 8 to prevent vibration of the camera housing 8 or track a specific object.

Referring to FIGS. 2 to 5, the present imaging optical device is explained in detail.

Figure 2A:
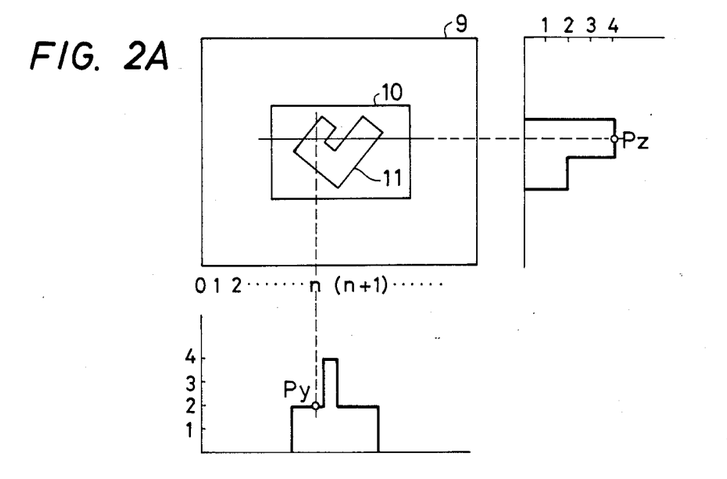
FIGS. 2A and 2B show embodiments of detection means.
Figure 2B:
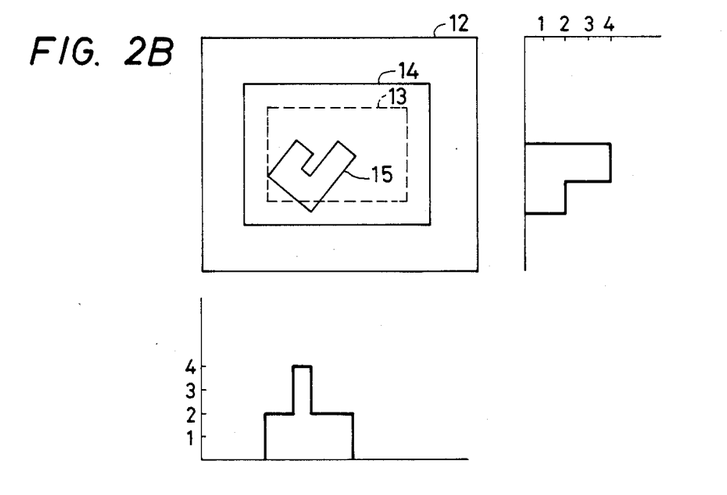

FIGS. 2 and 3 show an embodiment of the detection means 4 in the present imaging optical device. In FIGS. 2A and 2B, numeral 9 denote an image screen, numeral 10 denotes an area which surrounds a target image in the image screen 9, numeral 11 denotes an image pattern of the target image, numeral 12 denotes an image screen at a different time than that of the image screen 9, numeral 13 denotes an area corresponding to the area 10 in the image screen 9, numeral 14 denotes an area which surrounds the area 13 and the target image in tbe image screen 12, and numeral 15 denotes an image pattern of the same object as the image pattern 11 in the image screen 9. The position of the image pattern 15 changes in the image screen. Charts in FIGS. 2A and 2B show distributions of the members of vertical and horizontal characteristic points such as the numbers of edges which indicate the difference of contrasts of the image patterns 11 in the target image 10, and for the image patterns 11 and 15 in the areas 10 and 14.

Figures 3A, 3B, 3C:
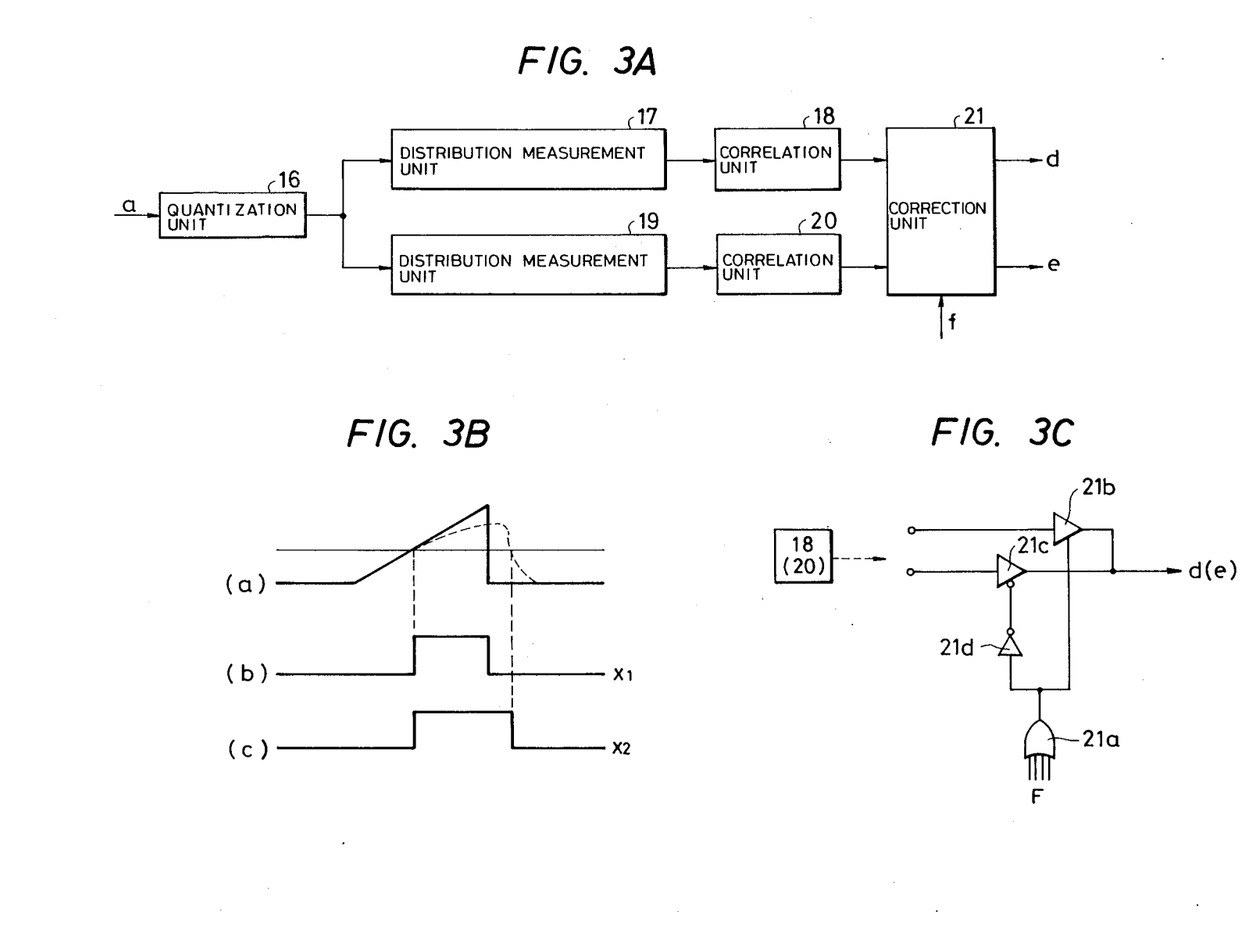
FIG. 3A shows a block diagram of the detection means.
FIG. 3B shows external information F.
FIG. 3C shows a circuit diagram of a correction unit 21.

FIG. 3A shows a block diagram of the detection means 4. Numeral 16 denotes a quantization unit for binarizing the image signal a, numeral 17 denotes a distribution measurement unit for measuring and storing a distribution of the number of edges in horizontal scan direction, numeral 18 denotes a correlation unit for correlating distributions of the numbers of edges in the horizontal scan direction for image patterns of the same object at different times, numeral 19 denotes a distribution measurement unit for measuring and storing a distribution of the number of edges in vertical scan direction, numeral 20 denotes a correlation unit for correlating distributions of the number of edges in the vertical scan direction for image patterns of the same object at different times, and numeral 21 denotes a correction unit which receives an external signal f such as a focal distance of the imaging optical system, a zoom ratio, a distance to an object and auto-focus signal for correcting the direction and distance of movement of the image supplied from the correlation units 18 and 19. A signal d includes at least a signal relating to horizontal movement of the image, and a signal e includes at least a signal relating to vertical movement of the image.

Figure 4:
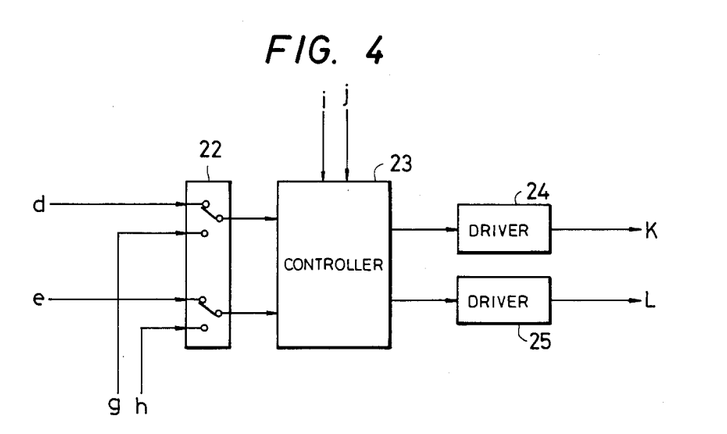
FIG. 4 is a block diagram of an embodiment of drive control means.
Figure 5A:
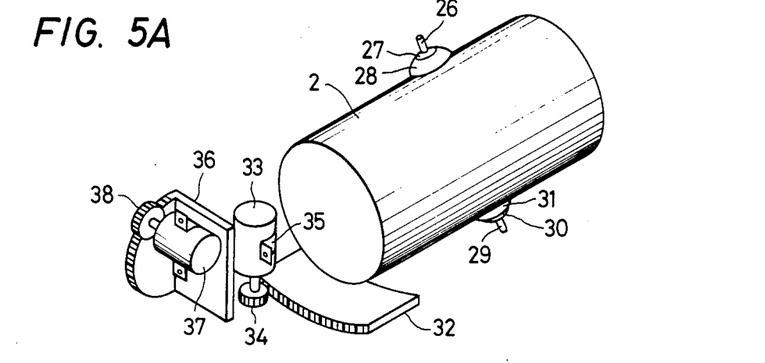
FIG. 5A to 5C show embodiments of a drive actuator.
Figure 5B:
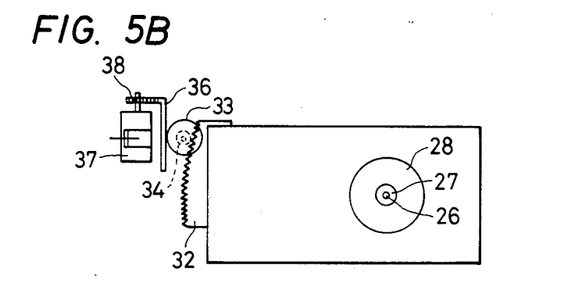
Figure 5C:
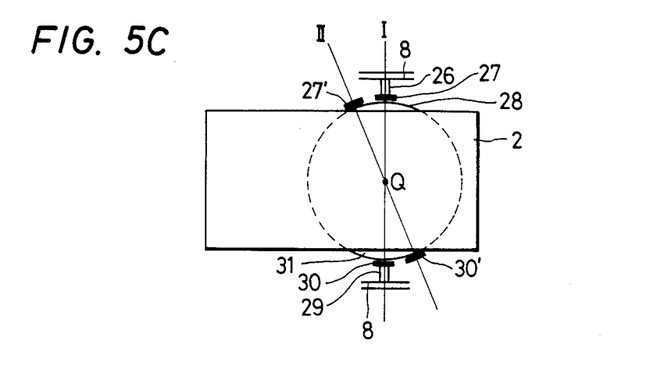

FIG. 4 shows a block diagram of the driver control means 5. Numeral 22 denotes a switch for selecting the output signals d and e of the correction unit 21 or other exteranl signals g and h, numeral 23 denotes a controller which receives the signals selected by the switch 22 and position detection signals i and j of the movable mechanism 7 to control position and drive speed of the movable mechanism 7, and numerals 24 and 25 denote horizontal and vertical actuator drive circuits for controlling direction and distance of movement of the image in accordance with the output signal from the controller 23. Signals k and l denote drive signals produced by the actuator drive circuits 24 and 25, respectively. FIG. 5 shows an embodiment of the drive actuator 6, in which FIG. 5A is a perspective view, FIG. 5B is a top view and FIG. 5C shows a principle of the movable mechanism 7. Numerals 26 and 29 denote support bars fixed to the camera housing 8, numerals 27 and 30 denote sliding spherical surfaces attached to the support bars 26 and 29, numerals 28 and 31 denote sliding spherical surfaces formed in the lens barrel 2, numeral 32 denotes a gear fixed to the lens barrel 2, numeral 33 denotes a motor, numeral 34 denotes a gear linked to the motor 33, numeral 35 denotes a fixing band, numeral 36 denotes a fixing member, numeral 37 denotes a motor fixed to the camera housing 8, and numeral 38 denotes a gear linked to the motor 37.

The concaved sliding spherical surfaces 27 and 28 are fixed to the camera housing 8 through the support bars 26 and 29. When a relative position between the lens barrel 2 and the camera housing 8 changes from a position shown by an auxiliary line I to a position shown by an auxiliary line II, the support bars and the sliding spherical surfaces 26, 27, 29 and 30 which form a universal support shaft maintains the relative position. Accordingly, the lens barrel 2 is movably held to the camera housing 8, and the image input means including the imaging optical system 1 in the lens barrel 2 and the image sensor 3 at a fixed relative position to the imaging optical system 1 is movable relative to the camera housing 8.

The gear 32 fixed to the lens barrel 32 has gear teeth arranged along a circle or arc centered at a rotating shaft connecting the support bars 26 and 29, and it is meshed with the gear 34 which is linked to and rotated by the motor 33 which in turn is driven by the drive signal k so that it horizontally drives the lens barrel 2 relative to the camera housing 8. On the other hand, gear teeth of the fixing member 36 for fixing the motor 3 are formed along circle or arc centered at a center $\theta$ of vertical rotation shown in FIG. 5C, and meshes with the gear 38 linked to the motor 37 driven by the drive signal l to vertically drive the lens barrel 2 relative to the camera housing 8.

The principle of operation of present imaging optical device is explained in detail with reference to FIGS. 1 to 5.

A target object of the present imaging optical device is focused on the image sensor 3 through the imaging optical system 1 at a time t1, and the image sensor 3 produces the image signal a which is displayed on a TV. The image signal a is supplied to the detection means 2 and binarized by the quantization unit 16 with a predetermined threshold. The area 10 is set in the image screen 9 and it is horizontally scanned by the distribution measurement unit 17, which counts the number of times of crossing of the image pattern 11. At the end of each horizontal scan, the number of times of crossing is counted, and the number of times of crossing or the number of edges is stored at a memory area for each horizontal scan line to form the distribution of the number of edges in the horizontal scan direction as shown in FIG. 2A. On the other hand, the distribution of the number of edges in the vertical scan direction as shown in FIG. 2B is produced by counting by the distribution measurement unit 19 the number of times of crossing of the horizontal scan line to the image pattern 11 at each timing which divide the horizontal scan period into any number of periods, in synchronism with the horizontal synchronization signal, incrementing the stored count for the horizontal scan, and, after the scan of the area 10, storing the number of edges at a memory address corresponding to said timing.

In the image screen 12 imaged at a time t2 other than the time t1, the relative position of the image pattern 15 to the image screen 12 has been changed due to the relative movement between the object and the imaging optical device. The image screen 12 is formed, the image signal a is binarized with the predetermined threshold by the quantization unit 16 of the detection means 2, the distributions of the number of edges at the times t1 and t2 in the horizontal and vertical scan directions in the area 14 are measured by the distribution measurement units 17 and 19, and the measurements are stored in the memories. Then, the correlation unit 18 correlates the distributions of the numbers of edges in the horizontal scan direction at the times t1 and t2 to determine the distance and direction of the relative movement in the horizontal direction of the image patterns 11 and 15, and the correlation unit 20 correlates the distributions of the number of edges in the vertical scan direction at the times t1 and t2 to determine the distance and direction of the relative movement in the vertical direction of the image patterns 11 and 15. The correction unit 21 receives the distance and direction of movement as well as external information F such as the focal distance of the imaging optical system 1, zoom ratio, distance to the object and auto-focus signal to determine whether it drives the image input means, and if it is driven, it selects the drive member and determines the drive distance, and processes the distance and direction of the movement of the image to produce the control signal d for horizontally shifting the image and the control signal e for vertically shifting the image.

In FIG. 3B, an auto-focus signal $f_1$ is applied to the correction unit 21 as the external information F.

A solid line waveshape (a) in FIG. 3B shows an image signal of an object at the in-focus time (time $t_1$), and a broken line waveform shows an image signal of the same object at the out-of-focus time (time $t_2$).

The image signals at the times $t_1$ and $t_2$ are binarized with the threshold level $L_{TH}$ to produce focus signals $x_1$ and $x_2$ shown in (b) and (c) of FIG. 3B.

FIG. 3C shows a circuit diagram of the correction unit 21. The circuit comprises an OR circuit 21a which receives the external information $F(f_1, f_2...)$, buffer circuits 21b and 21c which receive the output signal of the OR circuit 21a and the correlation signals from the horizontal and vertical correlation units 18 and 20, and an inverter 21d.

The buffer circuits 21b and 21c function as a data selector which outputs the signals from the correlation units 18 and 20 as they are or corrects them depending on the external information F. The control signal d(e) is applied to the drive control means 5 which generates a drive signal to drive the actuator 6. The switch 22 of the drive control means 5 receives the control signals d, e and external control signals g, h such as manual control signal and selects the control signals d, e or the external control signals g, h. The control signals d, e or g, h selected by the switch 22 and the position detection signals i, j of the movable mechanism 7 are processed by the controller 23 so that if the distance to the object is larger than a predetermined distance, a high speed driver is selected, and if the distance to the object is smaller than the predetermined distance, a low speed drive is selected. The drive signals k or l is supplied to the actuator 6 through the drive circuit 24 or 25. The image input means comprising the imaging optical system 2 and the image sensor 3 is driven by the actuator 6 in accordance with the drive signal k or l.

In the present imaging optical device, the direction and distance of movement of the image are detected based on the image signal produced by the image input means and they are fed back to the drive control means which drives the image input means incorporated in the camera housing. Thus, the entire device need not be driven but only a portion of the image input means may be driven. Accordingly, the load to the actuator is low and the power consumption is low.

Since the drive actuator may be of small size, a power supply may be of small size and durability is extended, and the entire device is compact and light. The mechanism to movably hold the image input means to the camera housing is simple and compact and very few members are externally added to the device. Accordingly, an operability of the device is improved and a hand-carry type imaging optical device is presented.

In the above embodiment, a rotary motion is used to drive the image input means. Alternatively, a linear motion may be used. In order to prevent degradation of sharpness of the image, a douser may be provided around the movable mechanism or in the camera housing to block light.

Figure 6:
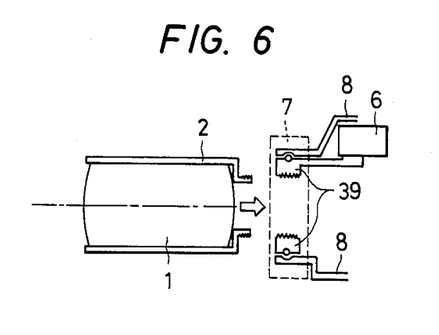
FIG. 6 shows an embodiment of a movable mechanism.

FIG. 6 shows another construction of the movable mechanism 7 shown in FIG. 1. The like elements to those shown in FIG. 1 are designated by the like numerals. Numeral 39 denotes a removal mechanism. In the present movable mechanism 7, the imaging optical system 1 is removable so that the imaging optical system 1 can be exchanged depending on an application. The removal mechanism 39 is movably attached to the camera housing 8 by a universal support shaft similar to the movable mechanism shown in FIG. 5, for a connecting area between the lens barrel 2 and the camera housing 8. A convex sliding spherical surface is fixed to the removal mechanism 39, which is two-dimensionally driven by an actuator such as a motor.

Figure 7:
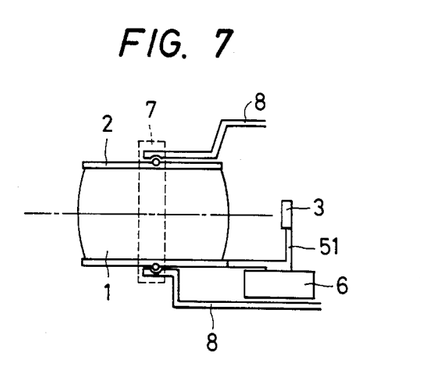
FIG. 7 shows an embodiment which integrates an imaging optical system and an image sensor.

In FIG. 7, the imaging optical system held in the lens barrel and the image sensor and integrated. The like elements to those shown in FIG. 1 are designated by the like numerals. Numeral 51 denotes a member fixed to the lens barrel 2 and housing the image sensor attached thereto. With this arrangement, the entire image input means comprising the imaging optical system 1 and the image sensor 3 can be two-dimensionally driven by the driver actuator 6.

Figure 8A:
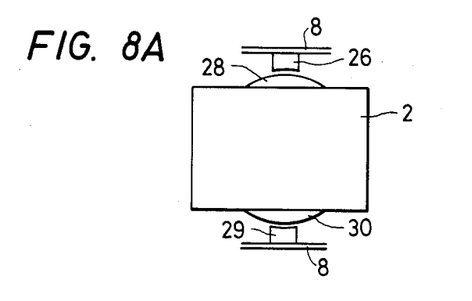
FIGS. 8A and 8B show other embodiments of a universal support shaft in the movable mechanism.
Figure 8B:
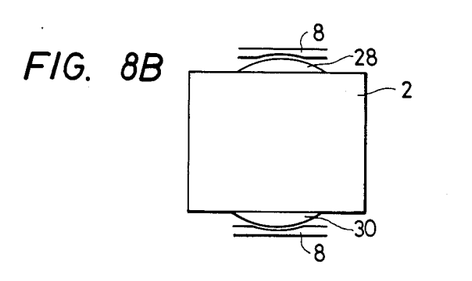

FIGS. 8A and 8B show other embodiment of the universal support shaft in the movable mechanism 7. The like elements to those shown in FIG. 5 are designated by the like numerals. In FIG. 8A, the support bars 26 and 29 have sliding spherical surfaces, and in FIG. 8B, the camera housing 8 has a sliding spherical surface.

There are various mechanism for driving the image input means and an appropriate one may be selected depending on performance and specification of the device. While the above mechanism is designed to drive the entire image input means, it may drive only portion or portions thereof.

The image signal produced by the image input means may be NTSC signal or any other signal form, and the feedback circuit and signal processing circuit which fit to the selected signal form may be used or a microcomputer under program control may be used.

The present imaging optical device can be applied to analog and digital television cameras, video cameras, photographic cameras, industrial cameras and electronic cameras, and various modifications can be made without departing from the concept of the present invention.

Figure 9:
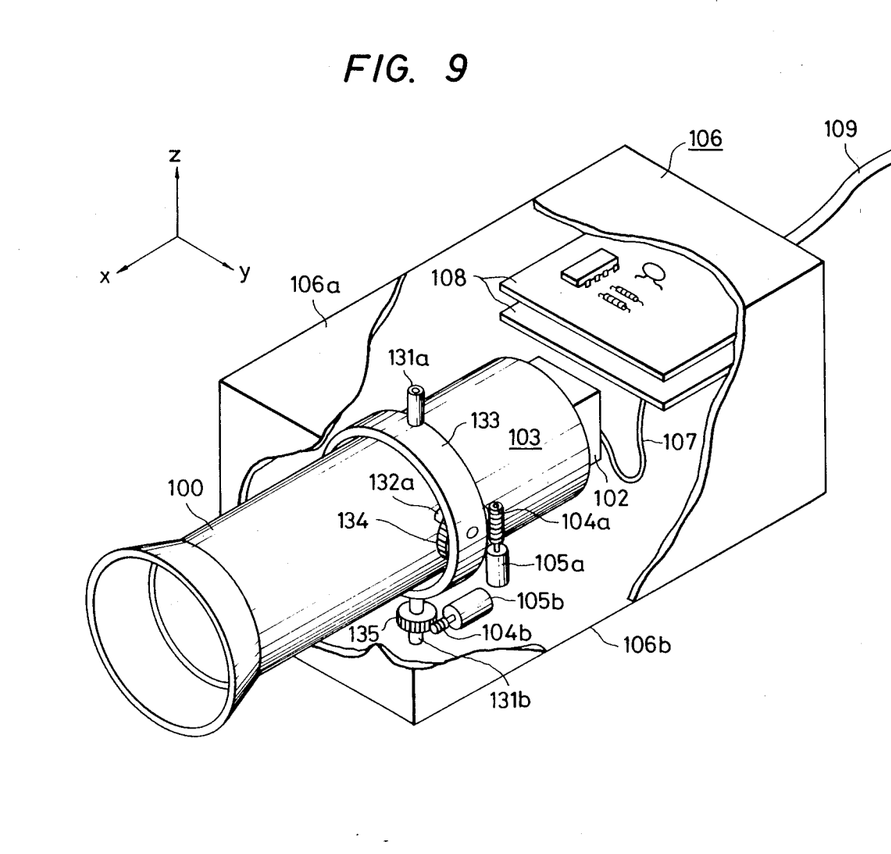
FIG. 9 shows another embodiment of the present invention.

FIG. 9 shows other embodiment of the present invention. Numeral 100 denotes a lens system including a hood, numeral 102 denotes a photo-electric conversion element which receives light through the lens system 100, and numeral 103 denotes a gimbal for supporting the lens system 100 and the photo-electric conversion element 102, which comprises two shafts 131a, 131b and 132a, 132b (not shown) and a ring member 133 arranged between the lens system 100 and a camera housing 106. The shaft 131a, 131b has one end thereof fixed to the ring member 133 and the other end rotatably attached to a top surface 106a and a bottom surface 106b of the camera housing or outer housing 106. The shaft 132a, 132b has one end thereof fixed to the lens barrel of the lens system 100 and the other end rotatably attached to the ring member 133. Accordingly, the lens system 100 and the photoelectric conversion element 102 are rotatably supported to the outer housing 106 around the y-axis and z-axis. Numerals 104a and 104b denote worm gears which transmit drive forces of motors 105a and 105b through worm wheels 134 and 135 fitted to the shafts 132a and 131b, respectively, to rotate the lens system 100 and the photoelectric conversion element 102 around the two axes of the gimbal 103. The motor 105a is fixed to the ring member 133 of the gimbal and the motor 105b is fixed to the bottom surface 106b of the camera housing 106. Numeral 107 denotes a signal transmission member for transmitting the output of the photo-electric conversion element to a circuit board which includes a signal processing circuit, an image vibration detection circuit and a drive control circuit, and numeral 109 denotes a coaxial cable for transmitting the image signal to a monitor 110. Numeral 130 denotes an imaging lens device which includes the imaging lens system 100 and the photo-electric conversion element 102.

The operation of the anti-vibration camera of the present embodiment is explained.

In FIG. 9, the output of the photo-electric conversion element 102 is supplied to the detection circuit of FIG. 3A through the signal processing circuit. The images at different times are correlated to detect the magnitude and direction of the image vibration, and the detected control signal is supplied to the drive control circuit of FIG. 4. In response to the control signal, the drive control circuit drives the motor 105 in a direction to cancel out the image vibration. Thus, even if an external disturbance is applied to the camera housing 106, the compensation described above is made so that the lens system 100 and the photo-electric conversion element 102 are held facing the object and a vibration-free stable image is produced.

In the present embodiment, the image vibration detection means correlates the image signals. Alternatively, an acceleration sensor may be mounted on the lens barrel of the lens system 1 and the control signal to the drive control circuit may be changed in accordance with the output of the sensor. The means for rotatably supporting the imaging lens device 130 comprising the lens system 100 and the photo-electric conversion element 102 need not be limited to the gimbal 103 shown in FIG. 9 and the drive means need not be limited to the combinaiton of the rotary motor and the gears. For example, the means for rotatably supporting the imaging lens device 130 may be a universal joint which connects the shaft having one end thereof fixed to the imaging lens device and the shaft having one end thereof fixed to the camera housing. In this case, the drive means drives the shaft having one end thereof fixed to the imaging lens device.

As described hereinabove, in accordance with the present invention, the imaging lens device comprising the lens system and the photo-electric conversion element is rotatably supported to the camera housing, and the relative position of the lens system and the photo-electric conversion element to the camera housing is controlled in accordance with the vibration signal of the detection means which detects the image vibration. Accordingly, the present invention offers the following advantages:

(1) Since there is no need to decenter a portion of the lens system or to insert a prism, optical characteristics such as intensity and chromatic aberration are not deteriorated and the range of correction is wide.

(2) Since only the lens system and the photo-electric conversion element are to be controlled for drive, the power of the drive system may be small and the entire camera device is compact and light.

(3) Since the entire camera device is compact, handheld photographing with a long focal distance lens is permitted, and a vibration-free stable image is produced even in hand-held photography. The vibration-free stable image is produced even when the camera is mounted on a moving vehicle or vibrating spot. Even if the camera is held by a beginner a vibration-free image can be produced.

We claim:

1. An image stabilizing device comprising:
   lens barrel having an imaging optical system and an image sensor integrated with said lens barrel;
   housing for supporting said lens barrel;
   generating means for generating a signal relating to vibration of the image based on image information produced by said image sensor; and
   driving means for moving said lens barrel relative to said housing based on the signal produced by said generating means to correct the vibration.

2. An image stabiizing device according to claim 1, wherein said lens barrel is supported by means of a gimbel on said housing.

3. An image stabilizing device according to claim 1, wherein said lens barrel is moved in accordance with a signal which is made by correcting the signal generated by said generating means based on a signal of said image optical system concerning image information.

4. An image stabilizing device according to claim 1, wherein said image information is focusing information of said image optical system with respect to an object, and wherein said control means causes said drive means to move said lens barrel in a high speed when the object is at distant place.

5. An image stabilizing device according to claim 1, wherein said signal concerning the vibration of the image is a signal concerning the comparison of said image information at two different times.

6. An image stabilizing device comprising:
   a lens barrel having an imaging optical system and an image sensor;
   a housing for supporting said lens barrel; and
   a first intermediate member mounted on said lens barrel and a second intermediate member mounted on said housing, said first intermediate member and said second intermediate member having respectively rotatable sliding surfaces in contact with each other.

* * * * *

UNITED STATES PATENT AND TRADEMARK OFFICE
CERTIFICATE OF CORRECTION

PATENT NO. : 4,788,596

DATED : November 29, 1988

INVENTOR(S) : Eigo Kawakami, et al.

It is certified that error appears in the above-identified patent and that said Letters Patent is hereby corrected as shown below: Title page:

AT [56] REFERENCES CITED

"3,958,008 5/1976 Schadler" should read
--3,958,080 5/1976 Schadler--.

COLUMN 1

Line 65, "presents" should read --prevents.

COLUMN 3

Line 18, "denote" should read --denotes--.
Line 25, "tbe" should read --the--.
Line 61, "exteranl" should read --external.

COLUMN 4

Line 36, "signal k" should read --signal K--.
Line 42, "signal l" should read --signal L--.

COLUMN 5

Line 68, "K or l" should read --K or L--.

UNITED STATES PATENT AND TRADEMARK OFFICE
CERTIFICATE OF CORRECTION

PATENT NO. : 4,788,596

DATED : November 29, 1988

INVENTOR(S) : Eigo Kawakami, et al.

It is certified that error appears in the above-identified patent and that said Letters Patent is hereby corrected as shown below:

COLUMN 6

Line 4, "K or l" should read --K or L--.
Line 44, "and" should read --are--.
Line 58, "mechanism" should read --mechanisms--.
Line 62, "only" should read --only a--.

COLUMN 8

Line 41, "stabiizing" should read --stabilizing--.

Signed and Sealed this

Ninth Day of January, 1990

Attest:

JEFFREY M. SAMUELS

*Attesting Officer*   *Acting Commissioner of Patents and Trademarks*